Patented Mar. 19, 1940

2,194,194

UNITED STATES PATENT OFFICE 2,194,194

PRODUCTION OF CHLORITES BY THE REDUCTION OF CHLORINE DIOXIDE

George Lewis Cunningham, Niagara Falls, N. Y., assignor to The Mathieson Alkali Works, Inc., New York, N. Y., a corporation of Virginia No Drawing. Application April 1, 1937, Serial No. 134,279

7 Claims. (Cl. 23—85)

This invention relates to improvements in the manufacture of water soluble chlorites. According to my invention, water soluble chlorites are produced by the reduction of chlorine dioxide in the presence of an alkaline material corresponding to the chlorite to be produced, by an independent reducing agent, the cation of which is a multivalent metal.

It has hitherto been proposed to form sodium chlorite by the reduction of chlorine dioxide by means of sodium peroxide; and to form calcium chlorite by the reduction of chlorine dioxide by means of calcium peroxide. In each of these cases the peroxide ion is the reducing agent, itself being oxidized to free oxygen. These reactions are necessarily limited in application because of the fact that the peroxide corresponding to the desired chlorite must be employed, since the cation of the peroxide becomes the cation of the chlorite. A further serious disadvantage in the use of these particular reagents in a commercial process is the fact that the peroxide reagent is completely destroyed with the liberation of free oxygen, thus preventing any recovery or regeneration of the reducing agent.

In the process of my invention the above mentioned difficulties are not encountered. Thus when operating according to the process of my invention, the reducing agent employed need not contain the cation of the chlorite to be produced as is essential when the peroxides are used. A further advantage is that the reducing agent is not destroyed as is the case with the peroxides, but the metallic component is merely oxidized to a higher valence level. The reducing agent may later be regenerated by simple well-known expedients, thus affording important economies of operation.

According to one embodiment of my invention, chlorine dioxide is reduced to chlorite ion in high yield by means of the reducing action of certain metallic oxides or hydroxides. The oxides and hydroxides which are suitable reducing agents are the lower oxides and hydroxides of multivalent or variable valence metals which are oxidized during the reaction to higher oxides or hydroxides of the same metals. Representative oxides and hydroxides which will successfully reduce $ClO_2$ to chlorite ion are the following: $MnO$ ($Mn(OH)_2$); $Cu_2O$ ($CuOH$); $PbO$ ($Pb(OH)_2$); $CeO_2$, and $FeO$. It is to be understood that the above list is not presented as a complete list of all the metallic oxides and hydroxides which will operate successfully in my process, but these compounds are cited merely as representative examples.

I have found that improved efficiencies and economies result from the use of two independent reagents, the function of each of which is independent of the other. The alkaline material to be employed is the oxide or hydroxide of an alkali metal, alkaline earth metal, or of magnesium, the cation of which corresponds to the cation of the chlorites to be produced. In this way relatively inexpensive metallic reducing agents may be used without regard to the produced chlorite. Under well regulated conditions over 90% of the $ClO_2$ can be converted to chlorite iron by this procedure.

The following summarized type reaction will illustrate my invention using MnO as the reducing oxide:

$$2ClO_2 + MnO + 2NaOH = 2NaClO_2 + MnO_2 + H_2O.$$

An outstanding advantage of the present invention is that the metallic reducing agent may be regenerated, and the process thus made cyclic with respect to this reagent. As mentioned above, when the hitherto used peroxides are employed, the reducing agent which in this case is the anion or peroxide ion, is destroyed. According to my invention, however, it is the cation which is the reducing agent, and this is merely oxidized to a higher valence level. This may then be reduced by any convenient method to its original state and reintroduced as the reducing agent in the process of the present invention. Thus in the above cited equation in which MnO is the reducing agent, the oxidized product is $MnO_2$. This is removed from the chlorite solution and treated with HCl according to the following chemical reaction:

$$MnO_2 + 4HCl = MnCl_2 + 2H_2O + Cl_2$$

It will be noted that $Cl_2$ is a by-product of this recovery step and may itself be recovered as a useful by-product. As will be explained below, $MnCl_2$ may be recovered from the solution and reintroduced into the reaction mixture in order to reduce the chlorine dioxide to chlorite; or MnO may be regenerated by the addition of alkali to the solution according to the following equation:

$$MnCl_2 + 2NaOH = MnO + H_2O + 2NaCl$$

The following experimental examples of the above described embodiment of my invention will serve to illustrate this application:

Example I

A slurry is prepared which contains 71 parts MnO and 80 parts NaOH in 800 parts H₂O. An inert gas containing ClO₂ is passed through the slurry until 135 parts ClO₂ has been absorbed. The precipitated MnO₂ is filtered off. The filtrate now contains dissolved NaClO₂ together with small amounts of sodium chlorate and chloride. The separated MnO₂ may now be reduced and re-employed as reducing agent.

Example II

A slurry is prepared which contains 223 parts PbO and 80 parts NaOH in 800 parts H₂O. An inert gas containing a small amount of ClO₂ gas is passed through the slurry until 135 parts ClO₂ has been absorbed. The precipitated PbO₂ is filtered off and reduced for further use. The filtrate now contains approximately 175 parts sodium chlorite, 5 parts sodium chlorate and a small amount of sodium chloride.

According to a further embodiment of my invention, it is possible to employ metallic ions of multivalent or variable valence metals supplied by salts of these metals as the reducing agent. In operating in accordance with this embodiment chlorites are produced by reacting ClO₂ with a solution of a salt, such as for example, MnCl₂ or PbCl₂ in the presence of an alkaline material, the cation of which corresponds to the cation of the chlorite to be produced. This salt may be obtained from any convenient source or, as mentioned above, in a cyclic process it can be obtained from the described recovery step of transforming MnO₂ to MnCl₂. It will be understood that in most cases in which salts of this nature are used in the presence of an alkaline material, the oxide or hydroxide will first precipitate out to a greater or less degree. It might, therefore, be said that to some extent at least, the reducion is being accomplished by the oxide or hydroxide of the multivalent metal. Whatever the mechanism of the reaction may be, I do not predicate my invention according to this embodiment on the fact that the reduction is accomplished either by a salt or by an oxide. The cation of a variable valence metal appears to be a successful reducing agent in my process regardless of whether it is introduced in the form of a salt, oxide or hydroxide of the metal.

The following experimental examples of this further embodiment of my invention will serve to illustrate its application:

Example III

A slurry is prepared by adding 252 parts MnCl₂ and 81 parts MgO to 800 parts H₂O. An inert gas containing small amounts of chlorine and chlorine dioxide is passed through this slurry until 135 parts ClO₂ and 71 parts Cl₂ have been absorbed. The precipitated MnO₂ is filtered off, and may be reduced to MnCl₂ for further use. The filtrate contains magnesium chlorite, magnesium chloride and a small amount of magnesium chlorate.

Example IV

A slurry is prepared by adding 556 parts PbCl₂ and 320 parts NaOH to 800 parts H₂O. An inert gas containing small amounts of chlorine and chlorine dioxide is passed through this slurry until 135 parts ClO₂ and 71 parts Cl₂ have been absorbed. The precipitated PbO₂ is filtered off. The filtrate contains approximately 177 parts sodium chlorite, 6 parts sodium chlorate, 4 parts sodium hypochlorite and 338 parts sodium chloride.

It is self-evident that the compounds of the multivalent metals employed in my process must have their metallic component in one of its lower valence states so that it will react as a reducing agent and will readily be oxidized during the process to a higher valence level.

In addition to the metals heretofore mentioned in this description, I have found that the following metallic cations, although not as efficient for various reasons as those already mentioned, will also successfully reduce chlorine dioxide to chlorite ion in an alkaline solution:

$$Ni^{++}, Co^{++}, Sn^{++}, \text{ and } Hg^{+}$$

One of the outstanding advantages of the process of the present invention is that it is unnecessary to completely remove any chlorine which may be admixed with the ClO₂ before the reduction reaction. In many methods for producing ClO₂, varying amounts of chlorine are also produced and this Cl₂ occurs as a contaminant in the effluent ClO₂ gas. The removal of this Cl₂ from the ClO₂ has always caused difficulty and involves extra separation steps. In my process, the purification of the ClO₂ with respect to Cl₂ is unnecessary. During the course of the reaction, the Cl₂ is reduced to chloride ion as indicated in the following typical equation:

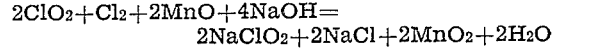

$$2ClO_2 + Cl_2 + 2MnO + 4NaOH = 2NaClO_2 + 2NaCl + 2MnO_2 + 2H_2O$$

The presence of any great amount of chlorine, of course, is not advantageous from an economic standpoint since a proportionately greater amount of free alkali is necessary with increasing amounts of chlorine. Examples III and IV above serve as illustrations of operations in which ClO₂ containing Cl₂ is employed.

The alkaline materials which are to be employed in the process of my invention are the oxides or hydroxides of the metals, the chlorite of which is to be produced. Thus in the preparation of NaClO₂ for example, NaOH would be employed. In the preparation of an alkaline earth metal chlorite, such as for example Ca(ClO₂)₂, either CaO or Ca(OH)₂ may successfully be employed.

In the most advantageous method of operating the process of my invention, a ClO₂ containing gas is passed into the solution or slurry containing the two independent reagents as described in the above presented experimental examples. It will be understood, however, that it is also possible to introduce the ClO₂ into the reaction by other means. Such an alternative method is the introduction of the ClO₂ into the reaction while dissolved in an aqueous solution.

I claim:

1. In the production of chlorites of the alkali metals and alkaline earth metals including magnesium by the reduction of chlorine dioxide, the improvement which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of a reducing metallic compound in which the cation is a variable valence metal in a reduced valence state.

2. In the production of chlorites of the alkali metals and alkaline earth metals including magnesium by the reduction of chlorine dioxide, the improvement which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of a reducing metallic oxide containing as a cation a metal of variable valence in one of its lower valence levels.

3. In the production of chlorites of the alkali metals and alkaline earth metals including magnesium by the reduction of chlorine dioxide, the improvement which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of manganous oxide.

4. In the production of chlorites of the alkali metals and alkaline earth metals including magnesium by the reduction of chlorine dioxide, the improvement which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of a reducing metallic hydroxide of a metal of variable valence in one of its lower valence levels.

5. In the production of chlorites of the alkali metals and alkaline earth metals including magnesium by the reduction of chlorine dioxide, the improvement which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of a soluble reducing metallic salt containing as a cation a metal of variable valence in one of its lower valence levels.

6. In the production of chlorites of the alkali metals and alkaline earth metals including magnesium by the reduction of chlorine dioxide, the improvement which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of manganous chloride.

7. The improved cyclic process for the production of chlorites of the alkali metals and alkaline earth metals including magnesium by the reduction of chlorine dioxide, which comprises reducing chlorine dioxide in an aqueous solution in the presence of an alkaline material selected from the class consisting of the oxides and hydroxides of the alkali metals and the alkaline earth metals including magnesium, the cation of which corresponds to the cation of the chlorite to be produced, said reduction being effected by means of an independent reducing agent containing a metal of variable valence in one of its lower valence levels, whereby said metal is oxidized to a higher valence level, recovering the thus oxidized metallic compound from the solution, reducing the said oxidized metallic compound and cyclically returning it to further reaction with chlorine dioxide.

GEORGE LEWIS CUNNINGHAM.